(12) United States Patent
Sarup et al.

(10) Patent No.: US 10,955,829 B2
(45) Date of Patent: Mar. 23, 2021

(54) SYSTEM AND A METHOD TO ENABLE ZERO DEFECT PRODUCTION

(71) Applicant: Gaurav Sarup, Punjab (IN)

(72) Inventors: Gaurav Sarup, Punjab (IN); Siddhant Sarup, Punjab (IN)

(73) Assignee: Gaurav Sarup, Punjab (IN)

( * ) Notice: Subject to any disclaimer, the term of this patent is extended or adjusted under 35 U.S.C. 154(b) by 0 days.

(21) Appl. No.: 16/937,625

(22) Filed: Jul. 24, 2020

(65) Prior Publication Data

US 2020/0356081 A1    Nov. 12, 2020

Related U.S. Application Data

(63) Continuation of application No. PCT/IN2020/050598, filed on Jul. 10, 2020.

(30) Foreign Application Priority Data

Mar. 26, 2020   (IN) .............................. 202011013201

(51) Int. Cl.
  *G05B 19/418*   (2006.01)
  *G06T 7/60*   (2017.01)
  *G06T 7/00*   (2017.01)

(52) U.S. Cl.
  CPC ..... *G05B 19/4184* (2013.01); *G05B 19/4183* (2013.01); *G05B 19/4185* (2013.01); *G05B 19/41865* (2013.01); *G06T 7/0004* (2013.01); *G06T 7/60* (2013.01)

(58) Field of Classification Search
  CPC ............ G05B 19/4184; G05B 19/4183; G05B 19/4185; G05B 19/41865; G06T 7/0004; G06T 7/60
  USPC ........................................................ 700/110
  See application file for complete search history.

(56) References Cited

U.S. PATENT DOCUMENTS

| | | | |
|---|---|---|---|
| 7,079,911 B2* | 7/2006 | Gallu ................. | G05B 19/4183 700/109 |
| 7,809,458 B2* | 10/2010 | Sasko .............. | G05B 19/41875 700/101 |
| 2009/0319077 A1* | 12/2009 | Cameron ............. | G05B 19/401 700/173 |

\* cited by examiner

*Primary Examiner* — Darrin D Dunn
*Assistant Examiner* — Christopher W Carter

(57) ABSTRACT

Embodiments of the present invention provide a comprehensive system that integrates automatically gauging and correcting stations operating in a machine environment with a universal machine monitoring for detecting defective articles, quarantining the defective articles, ensuring the defective articles are safely quarantined, analyzing the machine and article related data for providing contextual information for the defective articles produced, predicting one or more necessary actions to be taken for minimizing defects in future and achieving near zero defect quality in machine production. The comprehensive system provides such contextual information about the defects/faults in the article or the machine operations in real time and locally and remotely to any human resource.

20 Claims, 4 Drawing Sheets

SYSTEM AND A METHOD TO ENABLE ZERO DEFECT PRODUCTION

CROSS REFERENCE TO RELATED APPLICATIONS

The present application is a Continuation Application of PCT Application No. PCT/IN2020/050598 filed on Jul. 10, 2020, which claims the benefit of Indian Patent Application No. 202011013201 filed on Mar. 26, 2020. All the above are hereby incorporated by reference in their entirety.

FIELD OF THE INVENTION

The present invention is generally related to a system and method for eliminating defects in articles produced by a machine. More particularly, the present invention relates to system and method for minimizing defects and achieving zero defect quality in the articles produced by a machine by providing real time contextualized data of the defective articles in machine production.

BACKGROUND OF INVENTION

For improvements in performances of machines and minimizing defects in the articles produced by a machine, methods and systems have been developed to monitor functioning of the machine and collect statistics/data related thereto. Technologies have been provided for automatically collecting data related to the machines, which are later presented to the human operators, shop floor engineers and remote managers for them to analyze the data manually. Depending on the analysis of the operators/Engineers/Managers, the machines are regularly checked for any faults, alterations which can be made in the functions for improving quality of the end products, implementing steps or actions to minimize defects in quality of machine production, or any necessary action or preventive measures can be calculated manually by the operator and the like. "Machine production" refers to articles/parts produced by a machine, in the foregoing description.

Machine monitoring systems have been developed to monitor the working of machines in minute detail and record the working cycles and also the stoppage intervals between them. Periods in which machine is stopped for reasons like tool change, job changeover or breaks (lunch, tea, toilet, etc.) or any other reason (Power shutdown, raw material not available) are monitored and recorded by such systems.

Therefore, present technologies have provided methods for extracting data automatically and for analysis of the data with applications on computers or Cloud and to suggest corrective measures to be adopted for the machines to work smoothly and to minimize quality defects in machine production.

However, the present technologies do not provide a comprehensive solution to achieve zero defect quality in the machine production. Such as, the present technologies fail to provide adequate solutions to automatically remove the defective articles when they are detected, while also ensuring that that the defective article is safely removed from the production cycle. Further, the present technologies also do not provide appropriate solutions to provide insights for defects occurring in machine production, and also fail to provide solutions which explain the reasons for faulty productions.

Additionally, the present technologies fail to provide a system which may automatically anticipate any corrective measures to be taken for minimizing defects in quality of articles produced. It may be a case too, that the present technologies do not provide an effective timeline of implementing a corrective measure for improving the quality or minimizing the defects in the production. Hence, even after determining a preventive measure, an operator may delay in implementing that measure since he/she may be unaware of the time based urgency for taking that preventive measure.

Furthermore, in present machine production environment, customers expect near zero quality (e.g. few per million), but the 'skills' (Measurement skill, Analytical skill and Correction input skill) of skilled operators are declining. This is a very worrisome situation for manufacturers of machined articles (such as in automotive, aerospace, defense, railways, infrastructure, etc.). Also, auto-gauging stations are being used but are generally of elementary type without sophisticated algorithms. More importantly, their effectiveness cannot be monitored in real time.

There is also no method of linking events related to machine operation or machine behavior (for example tool changed, re-started after lunch, etc.) with production of defective articles and determining reasons for the article being defective (such as due to Bore or diameter etc.). Also, there is no method of monitoring in real time, the quarantining of defective articles produced.

Therefore, there is a need of a smart and comprehensive system and method that provides for minimizing defects in the machine production or even to achieve zero defect quality in the machine production, while also providing real time contextual information about the defects occurring in the machine production.

SUMMARY OF THE INVENTION

It is an objective of the present invention to provide a smart system and a method for achieving zero defective machine production by generating and providing real time based contextualized insights related to machine production and machine related environment.

It is an objective of the present invention to provide a smart system and a method for providing the contextualized insights to local and remote people globally in real time.

It is an objective of the present invention to provide a smart system and a method for automatic data extraction and data analytics for evaluating the machine related environment to automatically obtain insights of the machines and machine production.

It is an objective of the present invention to provide a smart and comprehensive system and method that provides for automatic inspection of the articles produced by a machine by gauging and automatically correcting errors in geometric tolerances of an article.

It is an objective of the present invention that the system and method also comprehensively combines the automatic inspection of the produced article with universal cloud based machine monitoring operations for automatically extracting machine and article related data for data analysis to provide insights related to defective articles produced and detected in machine production so that the machine production may achieve minimal defective quality and further may also achieve zero defective quality.

It is also an objective of the present invention to provide the comprehensive system and method that link events related to machine operation or machine behavior (for example tool changed, re-started after lunch, etc.) with production of defectives and determining reasons for the article being defective.

It is also an objective of the invention to quarantine a defective article as soon as it is detected and ensuring safe removal of that defective article too.

An objective of the present invention is to provide the smart system and the method for extracting data related to machines and produced articles and using data analytics on the extracted data for determining future necessary actions and monitoring those actions to ensure achievement of satisfactory results.

Yet another objective of the present invention is to implement a smart algorithm in the system which determine future necessary actions, initiate those actions on the machines and monitor those actions too, for ensuring satisfactory results.

Another objective of the present invention is to optimize quality of articles produced by machine tools, improve machine tool life, and safeguard machine health.

Yet another objective of the present invention is to improve machine productivity by initiating necessary actions as and when faults or deterioration in machine health, tool life, or quality of products is detected.

It is also an objective of the invention to ensure that human error involved while testing the products/tools/articles is eliminated.

An object of the present invention is to ensure that the CNC machines can be run by humans with minimal defects.

An object of the present invention is to ensure that the dependency on humans for quality testing is minimized.

An object of the present invention is to provide information of the defects to proper personnel on a timely basis and take appropriate corrective measures with system based accountability.

An important objective of the present invention is to ensure "no human intervention" in the "Contextualized Quality Information' being sent out and automatic alerts generated on the basis of preset thresholds.

An aspect of the present invention provides a comprehensive system for minimizing defects in articles produced by a manufacturing machine, the comprehensive system comprising: at least one auto-gauging station including: one or more probes and one or more measuring sensors for automatically inspecting and measuring one or more geometric tolerances of an article produced by the machine; and at least one processing unit, in communication with the probes and the measuring sensors, for comparing the measured one or more geometric tolerances of the article with one or more standard/desired geometric tolerances of the article and for determining a deviation in the measured one or more geometric tolerances of the article from the one or more standard/desired geometric tolerances; at least one monitoring apparatus, in communication with the at least one auto-gauging station, for continuously monitoring operations and environment of the machine and the article to extract data related to the machine and the article; at least one digital controller for executing digital communication between the at least one auto-gauging station and the at least one monitoring apparatus, and between the at least one monitoring apparatus and at least one quarantine apparatus; at least one quarantine apparatus, including at least one quarantine sensor, attached with the at least one auto-gauging station and in communication with the at least one digital controller, for quarantining one or more defective articles from the at least one auto-gauging station and for transmitting a quarantine signal to the at least one digital controller to send to a quarantine digital signal the at least one monitoring apparatus indicating and ensuring quarantining of the one or more defective articles; and wherein the comprehensive system is operable to: (a) detect, by the at least one auto-gauging station, a defective article based on the deviation that is determined in the measured one or more geometric tolerances of the article from the one or more standard/desired geometric tolerances; (b) generate, by the at least one digital controller being in communication with the at least one auto-gauging station, one or more output digital signals providing digital information at least related to the defective article, the digital information, provided by the one or more output digital signals, indicating at least about one or more measured geometric tolerances of the article that are deviated from the one or more standard/desired geometric tolerances, along with whether the deviated one or more measured geometric tolerances of the article is either rejected or re-workable and time of detection of defective article; (c) transmit, by the at least one digital controller, the one or more output digital signals to the at least one monitoring apparatus for processing the one or more output digital signals; (d) extract or determine, by the at least one monitoring apparatus executing one or more closed loop smart analytics software application, one or more machine operations or conditions that are performed immediately prior to a machine cycle that has produced the defective article, the determining of the one or more machine operations or conditions is after receiving and processing the one or more output digital signals, and the determining of the one or more machine operations or conditions being based on the at least one monitoring apparatus continuously monitoring the operations and environment of the machine and the article; and (e) compute, by the at least one monitoring apparatus executing one or more closed loop smart analytics software application, information related to the determined one or more machine operations or conditions that are performed immediately prior to the machine cycle that has produced the defective article with the digital information provided by the one or more output digital signals to determine and provide contextual insights related to the defective article, and wherein the at least one monitoring apparatus provides the contextual insights related to the defective article autonomously in real time to local and remote people; and wherein the at least one monitoring apparatus being in communication with the at least one quarantine apparatus ensures safe quarantining of the defective articles.

An aspect of the present invention provides a comprehensive method for minimizing defects in articles produced by a manufacturing machine, the comprehensive method comprising: automatically inspecting and measuring, by at least one auto-gauging station, one or more geometric tolerances of an article produced by the machine; comparing, by at least one auto-gauging station, the measured one or more geometric tolerances of the article with one or more standard/desired geometric tolerances of the article for determining a deviation in the measured one or more geometric tolerances of the article from the one or more standard/desired geometric tolerances and for detecting a defective article based on the deviation; continuously monitoring, by at least one monitoring apparatus, operations and environment of the machine and the article to extract data related to the machine and the article, the at least one monitoring apparatus being in communication with the at least one auto-gauging station; quarantining, by at least one quarantine apparatus attached with the at least one auto-gauging station and in communication with at least one digital controller, one or more defective articles from the at least one auto-gauging station; and transmitting, by the at least one quarantine apparatus including at least one quarantine sensor, a quarantine signal to the at least one digital controller to send a quarantine digital signal to the at least one monitoring apparatus indicating and ensuring quarantining of one or more defective articles; and wherein the comprehensive method is further operable to: (a) detect, by the at least one auto-gauging station, a defective article based on the deviation that is determined in the measured one or more geometric tolerances of the article from the one or more standard/desired geometric tolerances; (b) generate, by the at least one digital controller being in communication with the at least one auto-gauging station, one or more output digital signals providing digital information at least related to the defective article, the digital information, provided by the one or more output digital signals, indicating at least about one or more measured geometric tolerances of the article that are deviated from the one or more standard/desired geometric tolerances, along with whether the deviated one or more measured geometric tolerances of the article is either rejected or re-workable and time of detection of defective article; (c) transmit, by the at least one digital controller, the one or more output digital signals to the at least one monitoring apparatus for processing the one or more output digital signals; (d) extract or determine, by the at least one monitoring apparatus executing one or more closed loop smart analytics software application, one or more machine operations or conditions that are performed immediately prior to a machine cycle that has produced the defective article, the determining of the one or more machine operations or conditions is after receiving and processing the one or more output digital signals, and the determining of the one or more machine operations or conditions being based on the at least one monitoring apparatus continuously monitoring the operations and environment of the machine and the article; and (e) compute, by the at least one monitoring apparatus executing one or more closed loop smart analytics software application, information related to the determined one or more machine operations or conditions that are performed immediately prior to the machine cycle that has produced the defective article with the digital information provided by the one or more output digital signals to determine and provide contextual insights related to the defective article, and wherein the at least one monitoring apparatus provides the contextual insights related to the defective article autonomously in real time to local and remote people; and wherein the at least one monitoring apparatus being in communication with the at least one quarantine apparatus ensures safe quarantining of the defective articles.

Another aspect of the present invention provides the system and the method where the at least one monitoring apparatus includes a communication module to provide or transmit information in real time at least to one of local and remote people or one or more machines or a cloud server, the transmitted information including the contextual insights related to the defective article, alerts or notifications, machine and machine related data, the quarantine digital signal, and wherein the communication module may be a wired communication module for wired communication or a wireless communication module for wireless communication, and wherein the at least one monitoring apparatus repeats steps (d) and (e) until defects detected in an article are minimized or totally eliminated.

To further clarify advantages and features of the present invention, a more elaborate description of the invention will be rendered by reference to specific embodiments thereof, which is illustrated in the appended drawings. It is appreciated that these drawings depict only typical embodiments of the invention and are therefore not to be considered limiting of its scope

BRIEF DESCRIPTION OF DRAWINGS

For a better understanding of the embodiments of the systems and methods described herein, and to show more clearly how they may be carried into effect, references will now be made, by way of example, to the accompanying drawings, wherein like reference numerals represent like elements/components throughout and wherein.

DETAILED DESCRIPTION OF INVENTION

Figure 1:
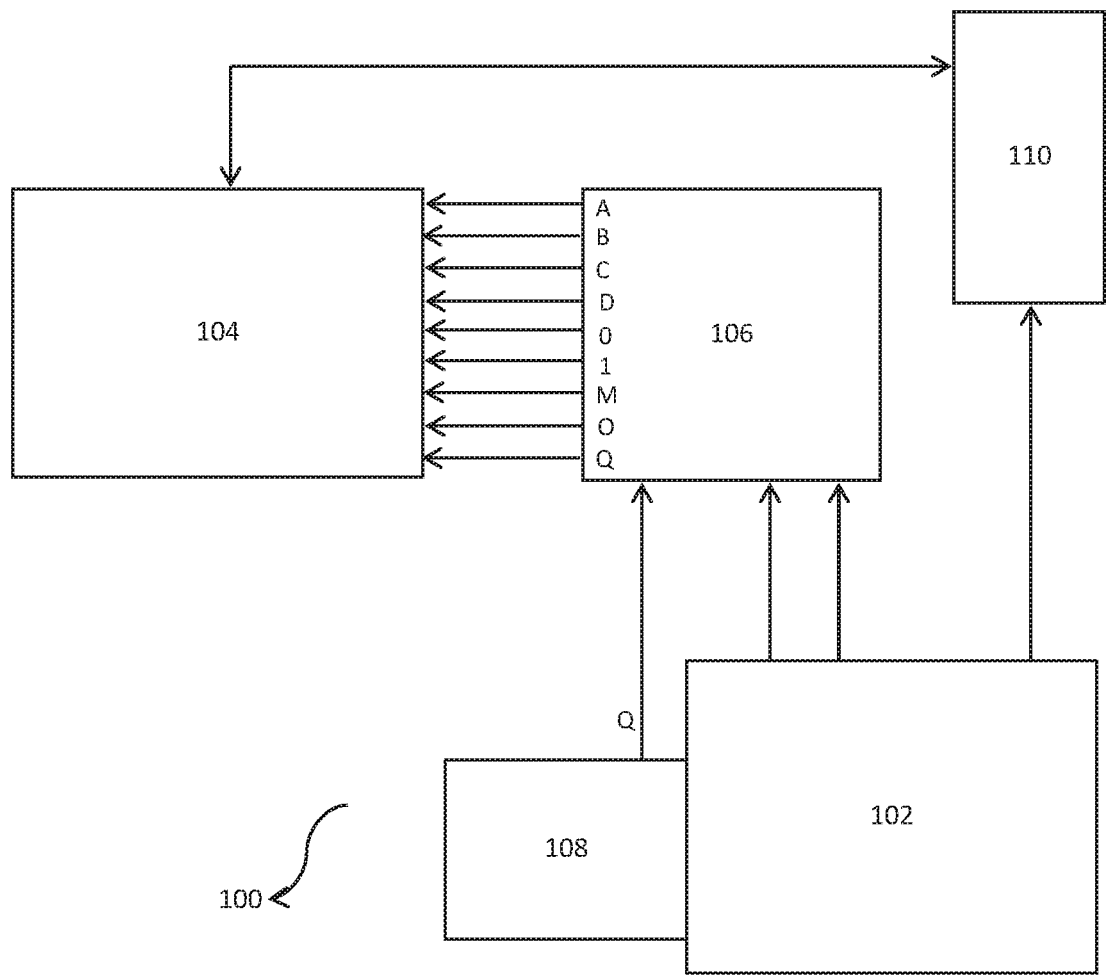
FIG. 1 illustrates an exemplary environment of a comprehensive system including an automatic inspection station for inspecting a produced article communicating with a machine monitoring system for minimizing defects in machine production, in accordance with an embodiment of the present invention.

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides a smart and comprehensive system and a method for an automatic inspection of an article produced by a machine, simultaneously quarantining a defective article as soon as it is detected, while also ensuring safe removal of the defective article from a machine production cycle, along with monitoring machine operations. The smart system and method comprehensively provides machine and machine production related data by automatically gauging and correcting defective articles in combination with a universal machine monitoring system for automatically generating and providing insights related to defects in machine production for minimizing those defects.

The automatic inspection of the articles includes automatically gauging and correcting geometric tolerances in an article. The universal machine monitoring system also automatically and continuously extracts machine and machine production related data in addition to receiving the data from the gauging stations for comprehensively providing insights related to defects in machine production for minimizing those defects. Further, in an embodiment, the universal machine monitoring system is a Cloud based system.

Therefore, the present invention comprehensively integrates operations of at least two sub-systems, one sub-system performing automatic inspection including automatically gauging and correcting defective articles; the automatic inspection system communicating with other sub-system performing continuous machine monitoring operations for automatically generating and providing insights related to defective articles produced in a machine cycle in order to minimizing those defects in future production.

The universal machine monitoring system is able to communicate with people who are locally situated around the machine along with people are remotely situated. So, the machine monitoring system provides the insights in real time to people globally, such as personnel on floor or managers at remote places. In an embodiment, the machine monitoring system may also be Cloud based, where any data can be communicated to a Cloud server from the machine monitoring system for access to anyone present globally.

Further, the universal machine monitoring is a closed loop autonomous system so that the comprehensive system of the present invention attains to achieve near zero or zero defective quality in machine production, after an unsatisfactory result is achieved from implementation of a corrective measure to correct the defective article.

FIG. 1 illustrates an exemplary environment of a comprehensive system including an automatic inspection station for inspecting a produced article communicating with a machine monitoring system for minimizing defects in machine production, in accordance with an embodiment of the present invention. The comprehensive system 100 comprehensively integrates at least two sub-systems or two apparatus, one sub-system or apparatus 102 performing automatic inspection operation of a produced article, the automatic inspection system 102 communicating with other sub-system or apparatus 104 performing universal machine monitoring operations (may be abbreviated and referred as "UMM system" or machine monitoring apparatus 104) for automatically generating and providing contextual insights, in real time, related to defective articles for minimizing defects. The automatic inspection system 102 includes automatically gauging and correcting a defective article. The automatic inspection system/apparatus 102 may be interexchangeably referred as "automatic inspection" or "auto-gauge" or "auto-gauging" throughout the description of the present invention, without deviating from the meaning and scope of the present invention. In an embodiment, the automatic inspection system 102 may be a digital inspection system. In an embodiment, the automatic inspection system 102 may be an analogue inspection system.

In a general exemplary working embodiment of the present invention, the UMM system 104 continuously transmits information or data related to a machine 110 and machine production, or alerts or notification. In an embodiment, the UMM system 104 may transmit information to at least one of one or more machines, locally and remotely situated people, or over cloud. It may be apparent to a person ordinary skilled in the art that the UMM system 104 may also be able to send information to any other concerned person or machine, without deviating from the meaning and scope of the present invention. The transmitted information may include and is not limited to information about machine operations, machine related environment, production, and information about defective articles detected by the auto-gauging system 102 and the like. It may be apparent to a person ordinary skilled in the art that the UMM system 104 may also be able to send any other required information to any other concerned person or machine, without deviating from the meaning and scope of the present invention.

The UMM system 104 also provides contextual information about the defective articles by adding additional information through its machine monitoring function along with the information received from the auto-gauging system 102. Additional information such as including and not limited to time and machine cycle when a defective article was first detected, such as after lunch break, and the like.

The comprehensive system 100 provides 'no human intervention' in sending the 'contextualised quality information' from the UMM system 104 and generating automatic alerts by the system 100 or the UMM system 104 on the basis of pre-set thresholds.

The system 100 includes the auto inspection or the auto-gauging system 102 for automatically gauging and correcting one or more geometric tolerances with respect to a produced article. In an embodiment, the auto-gauging system 102 includes one or more gauging stations that further include one or more probes or sensors for measuring one or more geometric tolerances with respect to an article. In an embodiment, the one or more probes are digital probes. In another embodiment, the one or more probes are analogous probes. The measured one or more geometric tolerances are compared to a standard or desired one or more geometric tolerances, and a deviation from the standard or desired one or more geometric tolerances in the measured one or more geometric tolerances is determined. Based on the deviation, the auto-gauging system 102 determines whether the measured one or more geometric tolerances in the article is re-workable or should be rejected completely.

The auto-gauging system 102 detects a non-conforming article produced which is a defected article based on the determined deviation. The auto-gauging system 102 further determines and provides information about the defective article such as including and not limited to time of producing the defective article, the geometric tolerance or dimension which has not met the standard because of which the article is non-conforming. The auto-gauging system 102 further determines and provides information that the defected article is a total loss which means it should be rejected or the defected article is re-workable or partially re-workable. The auto-gauging system 102 also further determines and provides information about the geometric tolerance or dimension which has extremely far deviated from the tolerance range. Such information may indicate faulty use of the gauging station or an error by the operator or any other serious matter that needs intervention. Additionally, the auto-gauging system 102 also determines and provides information that the gauging system needs to be mastered. Such information is transmitted to the UMM system 104, which further transmits the information to users who stays in the system, along with a start time indicating how long ago such information is indicated by the auto gauging system 102. Such information is transmitted to the UMM system 104 and then to the users when the gauging station is mastered.

All the information determined by the auto-gauging system 102, as explained above, may be collectively referred to as "inspected information". It may be apparent to a person skilled in the art that the auto-gauging system 102 may also inspect and determine any other information related to machine, articles produced, the related environment, and others to include in the "inspected information", without deviating from the meaning and scope of the present invention.

The auto-gauging system 102 sends such "inspected information", including whether the defective article is re-workable or should be rejected completely, in form of output digital signals to the UMM system 104 via a digital controller 106. The digital controller 106 receives the "inspected information" digitally converts the "inspected information" into the output digital signals. Thereafter, the digital controller 106 sends the output digital signals to the UMM system 104.

The auto-gauging system 102 also includes a correction unit for auto-correcting one or more geometric tolerance values which are deviated based on the identified deviation, when the deviation exists within a predetermined tolerance range in the one or more geometric tolerance values of the article based on comparison, such that corrected one or more geometric tolerance values of the article is equivalent to stored one or more desired/standard geometric tolerances. The corrected one or more geometric tolerance values may be communicated and applied to the machine 110.

The UMM system 104 receives the output digital signals, and the output digital signals informing the UMM system 104 of the "inspected information" related to at least the defective article, machine, and the related environment. The "inspected information" sent to the UMM system 104 includes such as the deviation in the measured one or more geometric tolerances in the article, and further that the defective article is re-workable or should be rejected completely. The UMM system 104 also receives the output digital signals that indicates the UMM system 104 of which measured one or more geometric tolerances in the article has not met the standard geometric tolerances.

The UMM system 104 includes one or more computing devices communicating with the auto gauging system 102 via the digital controller 106 to receive the output digital signals. The computing device may be an Internet of Things Box e.g. a laptop, that stores and executes one or more closed loop smart analytics algorithms for processing the output digital signals received from the digital controller 106. Further, the UMM system 104 includes one or more monitoring devices, communicating with the computing device, to continuously monitor machine, article and the related environment; and extract data or information related to at least the machine, article and the related environment. The monitoring device may be a camera. The monitoring device may be an integrated or internal part of the computing device or may be an external part of the computing device.

The UMM system 104 implements the smart analytics algorithm to process the output digital signals in order to extract the "inspected information" from the output digital signals, related to the defective articles and the machine operations. The UMM system 104 provides contextual insights based on the processing of the output digital signals and in addition, based on the continuously monitored data that is related to at least the machine or machine related environment or the article that has produced the defective article. The contextual insights may include and is not limited to contextual information about the machine or machine related environment or the article that has produced the defective article.

Since the UMM system 104 is continuously monitoring the whole machine production operations of the machine 110, the UMM system 104 is able to continuously extract information about the machine 110, machine cycles, machine related environment, articles, work pieces or tools, and any other necessary machine related information. Hence, after receiving the output digital signals from the digital controller 106 about the non-conforming articles and after processing the digital signals, the UMM system 104 is able to determine one or more machine conditions or operations that are performed immediately prior to the machine cycle that has produced the non-conforming article. In an embodiment, such one or more machine conditions or operations may include and are not limited to machine start-up, tool change, or the machine re-started after a stoppage (e.g. a break of X minutes)/Lunch Break/Shift Change, or job changeover (New Job Set), and the like operations which may lead to production of defective articles. Such one or more machine conditions or operations which are determined by the UMM system 104 to identify the machine conditions or operations which are performed just before the production of the defective article may be collectively referred to as "monitored defective data" leading to production of the defective articles. It may be apparent to a person skilled in the art that the UMM system 104 may also monitor and determine any other information related to the machine operations/conditions that may lead to production of the defective articles to include in the "monitored defective data", without deviating from the meaning and scope of the present invention.

The UMM system 104 may then compute or combine, using the smart analytics algorithm, the "monitored defective data" related to the one or more machine operations that may have led to production of defective articles with the "inspected information" extracted from the digital signals received from digital controller 106 and the auto-gauging system 102. The UMM system 104 then provides contextual insights based on the computation of the "monitored defective data" with the "inspected information". The contextual insights provide each and every possible information about production of the defective articles, such as including and not limited to when a defective article is produced, which geometric tolerance in the defective article is deviated, and whether the deviated geometric tolerance is re-workable or completely rejected, reasons of production of the defective article and the like. The contextual insights further help in in-depth analysis and improvements of machine production. In an embodiment, the contextual insights is analysed by concerned people to evaluate one or more actions which can be implemented to improve the quality in machine production by minimizing defects. In an embodiment, the contextual insights is automatically analysed by the smart analytics algorithm to evaluate one or more actions which can be implemented to improve the quality in machine production by minimizing defects.

Such contextual insights about the production of defective articles, that includes at least one or more machine operations which may lead to production of defective articles, not only provides which article is defected or which geometric tolerance of the article is defected or at what time the defective article is detected or produced or other data, but also provides the context including the reasons based on the whole machine and machine related environment that may have led to the production of such defective articles.

Further, the contextual insights may also be used to determine one or more actions, such as corrective measures to be implemented for minimizing defects, and the time into which such actions should be taken. Furthermore, the contextual insights may also be used to generate alerts based on one or more pre-set rules/guidelines. The rules may be written by users to generate alerts in case of crossing of pre-set thresholds. Such alerts can be sent immediately to concerned people, whether locally or remotely situated.

Therefore, the system 100 provides real time contextualized quality information and automatic alerts to local and remote people, such as floor managers, operators, or remote managers or buyers etc. for improving the quality in the machine production to achieve near zero or zero defective quality.

Furthermore, the comprehensive system 100 also comprises a quarantine system or apparatus 108, placed next to the auto-gauging system 102, for quarantining the defective articles as soon as they are detected by the auto-gauging system 102. The quarantine system 108 includes a quarantine bin that collects the defective articles. The quarantine system 108 also includes one or more sensors that confirm that the defective article is safely quarantined. These sensors may be termed as "quarantined sensors". The quarantine sensors communicate with the digital controller 106 to send out a quarantine digital signal to the UMM system 104 for confirmation that the defective or non-conforming article is safely quarantined.

The quarantine sensors communicate quarantine information, to the digital controller 106, about the safe quarantining of the defective articles. In turn, the digital controller 106 transmits a quarantine digital signal 'Q' to the UMM system 104. The quarantine digital signal 'Q' confirms that non-conforming article has been safely quarantined. The digital signal 'Q' from the quarantine sensor ensures traceability and further ensures that zero defectives reach the customer.

The digital signal 'Q' confirms that the non-conforming article has been quarantined. This closes the loop between detection and quarantining of defective/non-conforming articles. In a case, where the digital signal 'Q' is not received by the UMM system 104, the UMM system 104 can send alerts to designated personnel.

In an embodiment, the quarantine sensors may be a camera communicating with the digital controller 106. It may be apparent for a person ordinary skilled in the art that the quarantine sensor can be any position sensor or thermal sensor or any other sensor which is able to detect an article in the quarantine bin and generate the quarantine signal, without deviating from the meaning and scope of the present invention.

The UMM system 104 is able to communicate with people, such as floor personnel or even remote people such as managers, factory owners, or buyers, to continuously inform them about the whole machine environment, such for information about the machine, the articles, tools, machine related environment, and the like. In an embodiment, the local and remote people are continuously informed about the "inspected information", "monitored defective data", "quarantine signal 'Q'" and "contextual insights" in real time. The UMM system 104 provides real time contextual insights to local and remote people. In an embodiment, the UMM system 104 is cloud based.

Based on the above quarantine signal, a remote user, such as a remote buyer may also be informed in real time, that a particular defective article which is detected by the auto gauging system 102 is safely quarantined or not.

An exemplary embodiment of operation of the comprehensive system 100 is explained below for understanding operation of the system 100.

In an exemplary environment, say the auto-gauging system 102 measures plurality of quality parameters (dimensions) for example dimensions A, B, C, and D of produced articles and collects the "inspected information". If the auto-gauging system 102 determines any dimension to be deviated which means being out of tolerance limit, the auto-gauging system 102 may further determine that whether that article should either be Rejected (indicated by a digital output signal '0' by the digital controller 106) or Re-workable (indicated by a digital output signal '1' by the digital controller 106) based on the deviation.

Further, the information about the geometric tolerance or dimension which has extremely far deviated from the tolerance range is converted and indicated by a digital output signal '0' by the digital controller 106. Such digital output signal '0' may indicate faulty use of the gauging station or an error by the operator or any other serious matter that needs intervention. Furthermore, the information that the gauging system needs to be mastered is converted and indicated by a digital output signal 'M' by the digital controller 106. The digital output signal 'M' is transmitted to users, via the UMM system, who stays in the system, along with a start time indicating how long ago such signal is transmitted by the digital controller 106. Such signal is transmitted to the UMM system 104 and then to the users when the gauging station is mastered Hence, in an embodiment, the auto-gauging system 102 transmits the "inspected information" to the digital controller 106 and the digital controller 106 converts the "inspected information" into the output digital signals, including and not limited to A, B, C, D along with 1 and 0, in addition to M and O.

Now, in this situation, the "inspected information" in form of digital signals sent out by the digital controller 106 would be for example 'B & 0' or 'C & 1', 'M' or '0' and so on. The signals 'B & 0' or 'C & 1' mean that the dimension B is rejected while the dimension C can be re-workable. Any digital signal itself means a Non-Conforming (defective) article is produced. The digital signal such as 'B & 0' provides details of (a) why the article was non-conforming, for example the dimension bore or height is out of geometric tolerance and (b) whether it is a total loss (Rejected, as signalled by '0') or partially recoverable (re-workable, as signalled by '1').

Further, the digital controller 106 communicates with the UMM system 104 to send the digital signals to the UMM system 104. in an embodiment, the digital controller 106 implements a programmable logic, so it may be a PLC. In another embodiment, the digital controller 106 is a microprocessor or any computer. Therefore, the digital signals are communicated to the UMM system 104 via the digital controller 106. It may be apparent to a person ordinary skilled in the art that the digital controller 106 may be any computing device that is able to convert inspection information into the digital signals to be communicated to inform the UMM system 104, without deviating from the meaning and scope of the present invention.

In this exemplary situation, the digital controller 106 sends out at least 4 or more different output digital signals that are received as 4 or more different input digital signals by the UMM system 104 for 4 or more types of dimensions being measured (which are A, B, C, and D) with 2 digital outputs for Rejection, Rework (0, 1), and 2 other digital outputs 'M' for mastering and '0' for extreme deviation.

These digital signals are received by the UMM system 104, and the UMM system 104 implements the smart analytics algorithm for processing these digital signals to extract the "inspected information". Thereafter, the UMM system 104 extracts the "monitored defective data" from the continuously monitored machine data that includes machine and article related information. Further, the UMM system 104 computes, using the smart analytics algorithm, the "inspected information" with the "monitored defective data" to provide contextual insights or information about the defective articles for minimizing defects in the production of articles. The contextual insights or information may include and is not limited to one or more machine conditions or operations that are performed immediately prior to the machine cycle that has produced the non-conforming article, autonomously predicting future actions such as corrective measures to be implemented for correcting the defective measures, stipulated time period of implementing these corrective measures, when the defective article is produced, which dimension is out of tolerance limit and whether the defective article is rejected or re-workable, whether the defective article is safely quarantined, whether the gauging station is mastered or any dimension which is extremely deviated.

In an embodiment, such one or more machine operations may include and are not limited to tool change, or the machine re-started after a stoppage (e.g. a break of X minutes)/Lunch Break/Shift Change, or job changeover (New Job Set), and the like operations which may lead to production of defective articles.

Figure 2:
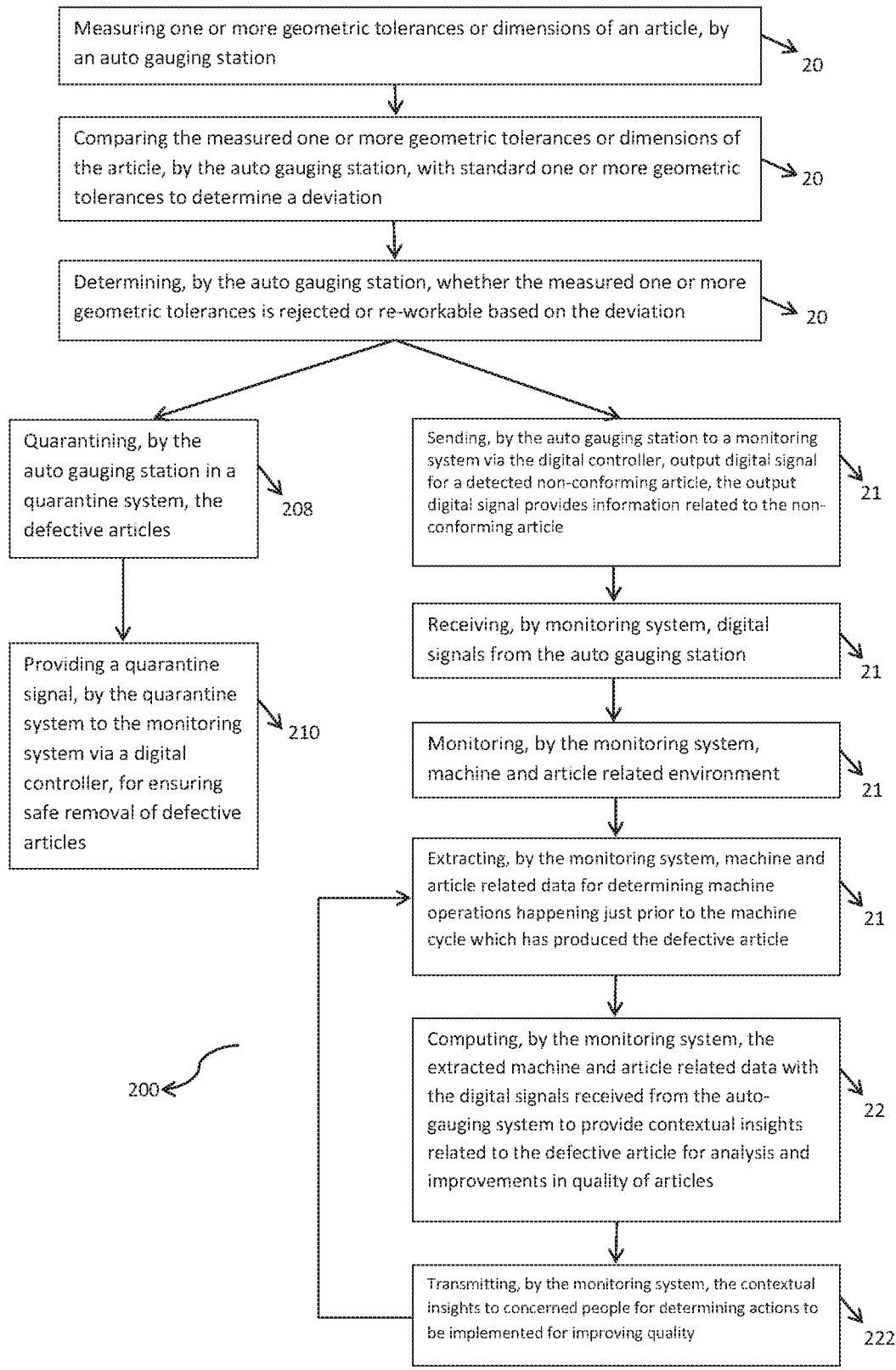
FIG. 2 illustrates an exemplary flow chart showing a comprehensive method of automatic inspection station for inspecting a produced article communicating with a machine monitoring system for minimizing defects in machine production, in accordance with an embodiment of the present invention.

FIG. 2 illustrates an exemplary flow chart showing a comprehensive method of automatic inspection station for inspecting a produced article communicating with a universal machine monitoring system for minimizing defects in machine production, in accordance with an embodiment of the present invention. The comprehensive method 200 should be read and understood in conjunction with the comprehensive system 100, and the method 200 includes and implements at least one or all components and embodiments of the system 100.

The method 200 comprises a step 202, of inspecting and measuring, by the auto gauging system 102, one or more geometric tolerances or dimensions of a produced article. The auto gauging system 102 may include one or more auto gauging stations including one or more probes and/or measuring sensors to inspect and measure the geometric tolerances or dimensions of an article. Further, at step 204, the auto gauging system 102 compares the measured one or more geometric tolerances or dimensions of the article with standard one or more geometric tolerances to determine a deviation in the measured one or more geometric tolerances or dimensions from the standard one or more geometric tolerances. The auto gauging system 102 may include a processing unit in operational interconnection with the probes/sensors to determine the deviation.

Thereafter, at step 206, the auto gauging system 102 determines whether the measured one or more geometric tolerances should be rejected or re-workable based on the deviation. The auto-gauging system 102 is also able to determine other information related to machine operations and environment along with the articles, as explained above in the FIG. 1. All the information determined by the auto-gauging system 102 may be collectively referred to as "inspected information". The "inspected information" may include and is not limited to information about the defective article such as time of producing the defective article, the geometric tolerance or dimension which has not met the standard and/or which has extremely deviated because of which the article is non-conforming, information that the defected article is a total loss which means it should be rejected or the defected article is re-workable or partially re-workable and the like. It may be apparent to a person skilled in the art that the auto-gauging system 102 may also inspect and determine any other information related to the defective articles to include in the "inspected information", without deviating from the meaning and scope of the present invention. The "inspected information" is explained above in the FIG. 1 in details.

At step 208, the auto gauging system 102 quarantines, in a quarantine system 108, the defective articles. At a next step 210, the quarantine system 108 including one or more quarantine sensors provides a quarantine signal to the UMM system 104 via the digital controller 106, for ensuring, to human resources, safe removal of defective article from the machine production cycles. In an embodiment, the quarantine sensor may be a camera communicating with the digital controller 106. It may be apparent for a person ordinary skilled in the art that the quarantine sensor can be any position sensor or a thermal sensor or any other sensor which is able to detect an article in the quarantine bin and generate the quarantine signal, without deviating from the meaning and scope of the present invention.

At step 212, the auto gauging system 102 transmits the "inspected information", to the digital controller 106, which in turn transmits the "inspected information" in form of one or more output digital signals, signalling a detected non-confirming article, to the UMM system 104. The auto-gauging system 102 further determines and provides information that the defected article is a total loss which means it should be rejected or the defected article is re-workable or partially re-workable. All the inspected information related to the non-conforming article is indicated by the output digital signals to the UMM system 104.

Any digital signal itself means a Non-Conforming (defective) article is produced. For example, the digital signal provides details of (a) why the article was non-conforming, for example the dimension bore or height is out of geometric tolerance and (b) whether it is a total loss (Rejected, as signalled by digital signal '0') or partially recoverable (re-workable, as signalled by digital signal '1').

At step 214, the UMM system 102 receives the output digital signals from the auto-gauging system 102 via the digital controller 106. The digital controller 106 inputs the corresponding output digital signals from the auto-gauging system 102 to the UMM system 104.

The UMM system 104, at step 216, is continuously and simultaneously monitoring the operations of the machine and machine related environment, such as monitoring the machine operations, tool operations, articles, and other surrounding environment of machine to continuously extract machine and article related information.

Now, since the UMM system 104 is continuously monitoring the machine and article related environment, therefore, after receiving the output digital signals from the digital controller 106 and after processing the digital signals, the UMM system 104 is able to determine one or more machine conditions or operations that are performed immediately prior to the machine cycle that has produced the non-conforming article, at step 218. In an embodiment, such one or more machine conditions or operations may include and are not limited to tool change, or the machine re-started after a stoppage (e.g. a break of X minutes)/Lunch Break/Shift Change, or job changeover (New Job Set), and the like operations which may lead to production of defective articles.

Such one or more machine conditions or operations which are determined by the UMM system 104 to identify the machine conditions or operations which are performed just before the production of the defective article may be collectively referred to as "monitored defective data" leading to production of the defective articles. It may be apparent to a person skilled in the art that the UMM system 104 may also monitor and determine any other information related to the machine operations/conditions that may lead to production of the defective articles to include in the "monitored defective data", without deviating from the meaning and scope of the present invention.

At step 220, the UMM system 104 may then compute or combine, using the smart analytics algorithm, the "monitored defective data" related to the one or more machine operations that may have led to production of defective articles with "inspected information" extracted from the digital signals received from the digital controller 106. The UMM system 104 then provides contextual insights based on the computation of the "monitored defective data" and the "inspected information". The contextual insights provide each and every possible information about production of the defective articles that leads to analysis and improvements.

At a step 222, the UMM system 104 transmits the contextual insights to concerned people. In an embodiment, the UMM system 104 may transmit information to at least one of one or more machines, locally and remotely situated people, or over cloud. It may be apparent to a person ordinary skilled in the art that the UMM system 104 may also be able to send information to any other concerned person or machine, without deviating from the meaning and scope of the present invention.

After receiving the contextual insights, the concerned people may analyze the contextual insights for determining one or more actions, such as corrective measures, to be taken for improving the quality in machine production, by minimizing defects, while also providing a stipulated time in which such actions should be implemented. In an embodiment, the UMM system 104 may analyze the contextual insights, using the smart algorithms, for determining the one or more actions to be implemented for improving quality in production.

In situations, where after determining the actions, such as corrective measures to be taken, satisfactory results cannot be obtained the UMM system 104 loops back to the step 218 for re-analyzing real time monitoring operations to determine the one or more machine operations that may have led to production of defective articles, until satisfactory result in machine production is achieved.

Therefore, the UMM system 104 along with the auto-gauging system 102 in the system 100 provides a closed loop autonomous system for automatically improving the quality in machine production by minimizing defects in articles, and additionally by quarantining, by the auto-gauging system 102, the defective articles and ensuring safe removal of such articles by the UMM system 104.

The auto-gauging system 102 and the UMM system 104 are explained in details in the following detailed description and figures.

Figure 3:
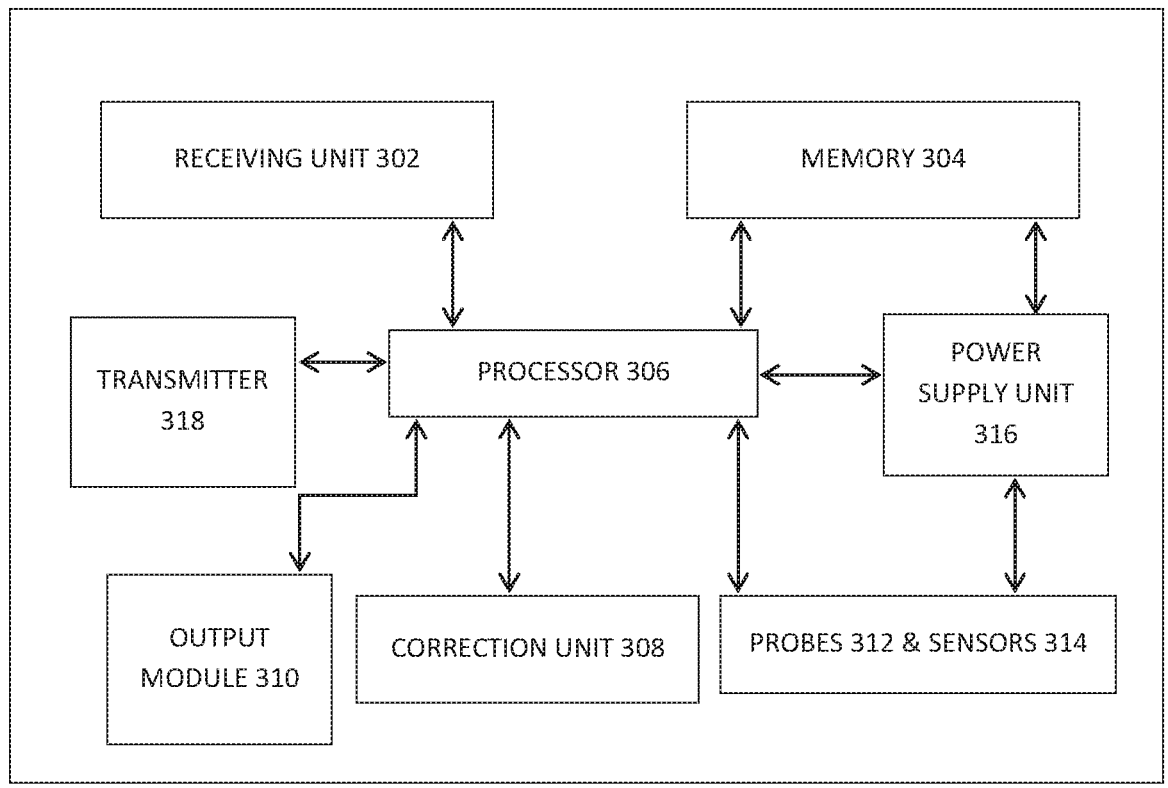
FIG. 3 illustrates an exemplary environment showing the auto-inspection system included in the comprehensive system, in accordance with an embodiment of the present invention.

FIG. 3 illustrates an exemplary environment showing the auto-inspection system 102 included in the comprehensive system 100, in accordance with an embodiment of the present invention. The exemplary environment 300 showing the auto-inspection system or the auto-gauging system 102. In an embodiment, the auto-gauging system 102 includes a receiving means/unit 302 for receiving one or more desired/standard geometric tolerance values in respect of an article from a user and a memory 304 for storing the one or more desired/standard geometric tolerances values in respect of the article. The auto-gauging system 102 is further provided with a processor 306 which in operational interconnection with one or more probes is configured for: measuring one or more geometric tolerance values in respect of a produced article; comparing the measured one or more geometric tolerance values in respect of the article with the corresponding stored one or more desired/standard geometric tolerance values; and assessing existence of a deviation within a predetermined tolerance range in said one or more geometric tolerance values measured in respect of the article based on comparison. In an embodiment, the one or more probes are digital probes. In another embodiment, the one or more probes are analogous probes.

Resultantly, the auto-gauging system 102 determines whether the produced article should be rejected or re-worked based on the deviation. The auto-gauging system 102 collects the "inspected information" related to the defective articles and the machine 110, as explained above.

In an embodiment, the auto-gauging system 102 further includes a correction unit 308 that comprises one or more microprocessors and processing algorithms for auto-correcting one or more geometric tolerance values in respect of the article based on the identified deviation, when the deviation exists within a predetermined tolerance range in the one or more geometric tolerance values in respect of the article based on the comparison, such that corrected one or more geometric tolerance values in respect of the article is equivalent to stored one or more desired/standard geometric tolerances.

The auto-gauging system 102 further includes an output module 310 such as a display screen to display one or more of: the measured one or more geometric tolerance values in respect of the article; results of comparison of the measured one or more geometric tolerance values in respect of the article with the corresponding stored one or more desired/standard geometric tolerance values; the correction value to be applied to one or more geometric tolerance values in respect of the article based on identified deviation; log details pertaining to the measurement and comparison.

The memory 304 further stores the measured one or more geometric tolerance values in respect of the article, results of comparison of the measured one or more geometric tolerance values of the article with the corresponding stored one or more desired/standard geometric tolerance values, the correction value to be applied to one or more geometric tolerance values in respect of the article based on identified deviation, log details pertaining to the measurement and comparison. The log details include date and time stamp on which the article was checked.

In an embodiment, the auto-gauging system 102 further includes one or more probes 312 including touch probes, digital probes including one or more of lasers. In an embodiment, the auto-gauging system 102 further includes one or more sensors 314 including cameras, position sensors, pressure sensors, gauges etc. to sense placement of correct article.

In an embodiment, the auto-gauging system 102 further includes a power supply unit 316 for supplying power various components of the auto-gauging system 102.

In an embodiment, the auto-gauging system 102 further includes a transmitter 318 for transmitting a signal to the user in the event of existence of deviation beyond the predetermined tolerance range in the one or more geometric tolerance values measured in respect of the article. The signal is generally sent in the form of an alert message/notification and is displayed on the display.

In an embodiment, the auto-gauging system 102 further communicates with the digital controller 106 via a communication unit included in the auto gauging system 102 to communicate the inspected information to the digital controller 106. In an embodiment, the auto-gauging system 102 may transmit the inspected information to the digital controller 106 via the transmitter 318.

Figure 4:
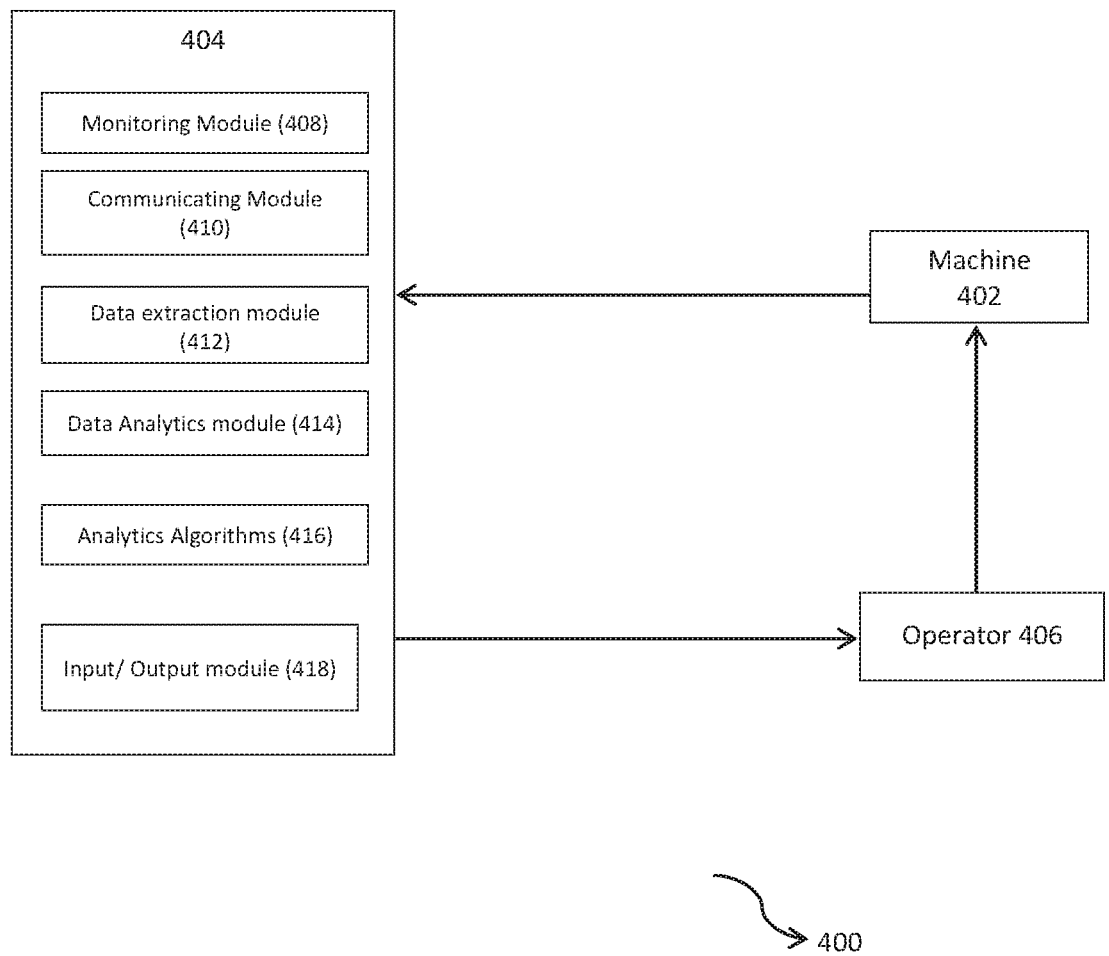
FIG. 4 illustrates an exemplary environment showing the machine monitoring system included in the comprehensive system, in accordance with an embodiment of the present invention.

FIG. 4 illustrates an exemplary environment showing the UMM system 104 included in the comprehensive system 100, in accordance with an embodiment of the present invention. The UMM system 104 can be implemented in a machine environment 400 to monitor functioning of the machine 110, such as a CNC machine, to extract data from the machine 110, and use data analytics to obtain insights and predict actions. The UMM system 104 may comprise a smart device installed with an analytics application implementing a smart analytics algorithm which may communicate with one or more machines operating in an environment, such as including and not limited to the CNC machine, auto-gauging stations or system 102, quarantine bin 108 or digital controller 106.

The UMM system 104, using the smart device with the analytics application, continuously extracts data from the one or more machines by monitoring the machine operations; and receive the digital output signals from the digital controller 106. Thereafter, the smart device with the analytics application uses one or more analytics techniques on the extracted data and the received output digital signals for obtaining insights related to defective articles produced in the machine production cycles and other machine related data. In an embodiment, the analytics application also predicts autonomous future actions, for example a corrective measure, to be taken. The analytics application may be a web based application or a mobile based application running on the smart device, such as a desktop, a laptop, a mobile smart phone, a tablet, or an I-Pad. Further, the smart device may be operated or controlled by an operator, and the operator is able to monitor the machine(s) via the smart analytics application, and is able to be informed about any future actions to be employed at the machine.

In FIG. 4, a machine 402 (such as the machine 110) is communicating with the smart device 404 for allowing the smart device 404 to continuously monitor functioning of the machine 402. The smart device 404 may be a computing device which includes and is not limited to a laptop, a desktop, a smart phone, a tablet, an I-pad, an Internet appliance, and the like. The smart device 404 also communicates with an operator 406 of the machine 402, for communicating all necessary information about the machine 402 to the operator 406, the machine information such as including and not limited to condition of the machine 402, quality of products produced by the machine, faults/defective articles produced by the machine which are detected by the auto-gauging system 102, contextual insights related to the faults/defective articles produced by the machine, one or more machine operations performed immediately before the machine cycle that has produced the defective articles, information related to parts/components of the machine, readings of the machine, one or more future actions to be taken, quarantined articles and the like.

Further, it may be apparent to a person skilled in the art that the smart device 404 is not restricted to monitor only one machine 402 and is able to monitor more than one machine at a time, without departing from the meaning and scope of the present invention. Furthermore, it may be apparent to a person skilled in the art that the machine information communicated by the smart device 404 is not restricted to the above mentioned, and may also communicate other machine information known in the art, without departing from the meaning and scope of the present invention. An operator may be a designated personnel or a floor engineer who are immediately communicated with the machine information or a remotely situated supervisor, manager, owner, buyer, and the like.

In an embodiment, the smart device 404 may also remotely communicate with other human resources, such as plant managers, or globally with other offices, and inform them with the contextual insights and the machines related information.

The smart device 404 comprises a monitoring module 408, a communicating module 410, data extraction module 412, a data analytics module 412 executing one or more data analytics algorithms 414 and an input/output device 416. The smart device 404 continuously monitors functioning of the machine 402, articles produced, along with the machine environment 400 using the monitoring module 408. The monitoring module 408 may be including and not limiting to a video camera, a microphone, a digital camera, individually or in combination. In an embodiment, the monitoring module 408 is an internal part of the smart device 404. In another embodiment, the monitoring module 408 is externally connected with the smart device 404, via a wired or a wireless connection. A wireless connection may be a short range wireless connection, such as a Bluetooth, or may be wireless local area network connection including the Internet, and the like. When externally connected, the monitoring module 408 sends captured machine(s) and article related data to the smart device 404 via the wired or wireless connection.

Further, the smart device 404 may communicate with the machine 402 via the communicating module 410 to communicate necessary information, contextual insights, alerts or other notification, for example the smart device 404 may instruct the machine 402 to follow a set of operating instructions such as including and not limiting to start or stop its operations at a certain situation or a time period, or implement a certain future action, such as a corrective measure, or start a particular function, or stop a certain part of the machine, and the like, depending on analysis of extracted machine data. Furthermore, the smart device 404 may communicate with the concerned people, such as local operators around the machine 402, or remotely placed people, such as managers, buyers, etc. via the communicating module 410 to communicate necessary information, contextual insights, alerts or other notification. The communication module 410 may be a wired or a wireless communicating module implementing wired or wireless communication protocols. The wired communication may include LAN, cable connection, optical fiber connection, Ethernet, and the like without limitation. The wireless communication may include and not limit to any long range or short range communication such as WLAN, WAN, Internet, Bluetooth, Infrared and the like.

Therefore, the smart device 404 may communicate with the concerned people, such as local operators around the machine 402, or the surrounding machines using wired communication such as LAN, or using wireless communication such as WLAN or Internet. While, the smart device 404 may communicate with the concerned people, such as remote operators or machines placed in different facility, using wireless communication such as WLAN or Internet or others. It may be apparent to a person skilled in the art that the smart device may communicate with local and remote people and machines using appropriate communication depending on the communication range, without deviating from the meaning and scope of the present invention.

Further, the smart device 404 monitors the machine 402 and the articles produced, and extracts all raw and/or functioning machine data related to the machine 402 and also the articles produced, using the data extraction module 412. In an embodiment, the data analytics module 414 may also extract the machine environment related data. Machine data that is extracted by the smart device 404 using the data extraction module 412 may be related to and not limited to readings depicting operations of the machine, such as RPM, alignment of a lathe table, rotating angle, angle of operation of a tool, or quality/measurements of end products produced by the machine 402, and data extracted from the digital signals received from the auto gauging system 102. Any data of the machine that depicts functioning and quality of produce of the machine is extracted by the smart device 404. Further, in an embodiment, the data extraction module 412 may also extract data of the machine's environment such as ambient temperature, vacuum, lighting condition, etc. using devices like room thermometer, etc.

Also, the smart device 404 receives the output digital signals from the digital controller 106, where the output digital signals provides the "inspected information" related to the defective articles produced by the machine 402 and the machine 402 itself. The "inspected information" is explained in details above.

Further, the data extraction module 412 extracts the "inspected information" from the output digital signals. Also, the data extraction module 412 extracts the "monitored defective data" from the continuously monitored machine and article related operations/environment. The "monitored defective data" is explained in details above. The data extraction module 412 provides all the extracted data to the data analytics module 414 for evaluation. The data analytics module 414 may execute and implement one or more closed loop analytics algorithms 416 on the "inspected information" from the output digital signals with the "monitored defective data" for obtaining real time contextual insights of the machine 402, produced articles and the machine's environment. The contextual insights may include and is not limited to contextual information about the machine or machine related environment or the article that has produced the defective article. The contextual insights or information is already explained in details above.

Further, in an embodiment, the data analytics module 414 also evaluates the "inspected information" from the output digital signals with the "monitored defective data" for autonomously determining or predicting one or more future actions for the machine 402 to employ in order to minimize production of defects. The future actions predicted being for improving the quality of the machine by minimizing defects in the articles produced by the machine 402. The one or more future actions may be included in the contextual information. In an embodiment, the one or more future actions are evaluated by the operators or concerned people after analyzing the contextual insights.

The future actions autonomously predicted by the smart device 404 or the operators may include and not limited to one or more necessary corrective measures that should be taken by the machine, one or more operating actions necessary to be implemented by the machine to optimize quality of products produced by machine tools, to improve tool life, to safeguard machine health and improve productivity, for example changing angle of rotation of the cutting tool, or speed of rotation, or changing alignment of a lathe tool, etc. The data analytics module 414 employing one or more closed loop data analytics algorithms 416 or the operators arrive at certain conclusions from the contextual insights which can then be informed in real time to other human resources, and used by them to take necessary decisions or actions for achieving near zero defect quality. In an embodiment, the contextual insights are also manually analyzed by concerned people for evaluating any future actions to be implemented for minimizing defects in machine production.

In an embodiment, the data analytics module 414 not only autonomously determines future actions to be employed at/by the machine 402, but also instructs the machine 402 and/or the operators to initiate those future actions, with the help of the communicating module 410. This means, once the data analytics module 414 determines one or more future actions; the data analytics module 414 communicates these actions to the communicating module 410, which in turn communicates these future actions to the machine 402 and instructs it to employ these actions. The future actions are also communicated to the operator in situations where operator's assistance or supervision is needed, following which the operator implements the actions on the machines. The data analytics module 414 also determines a time period and/or machine operating condition when a particular future action should be employed at/by the machine 402 or the operator.

In an embodiment, all the machine information, the data related to machine environment, the "inspected information", the "monitored defective data" are transmitted to a cloud based server, and are stored in the cloud server. The cloud server is in communication with the smart device 404 via the communicating module 410, and sends and receives data to/from the smart device 404. Receiving the data from the cloud based server, the smart device 404 runs or executes the closed loop analytics algorithms 416 on the data for determining real time contextual insights about the defective articles, and predict one or more future actions to be implemented on the machines. The cloud based server also stores the one or more future actions. The smart device 404 remotely communicates with human resources and global offices, via the cloud based server, to communicate the machine data, the data related to machine environment, the "inspected information", the "monitored defective data" and the one or more future actions through a wireless connection over a network such the Internet.

Further, the data analytics module 414 or the operators also determines or anticipates a safe time period within which a particular future action must be employed at/by the machine 402, failing which may result in an unsatisfactory outcome. The smart device 404 communicates all the insights and the evaluation, including the condition of the machine 402, future actions, and the safe time period, determined by the data analytics module 414 to the local operator 406 via an input/output module 418. The input/output module 418 may include and is not limited to a display screen, a touch sensitive display screen, a keypad, a touch keypad, a speaker, a microphone, a monitor and the like, using which the operator 406 is informed about the functioning of the machine, future actions to be taken within the safe time period, and is also able to input a required machine data, or a required instruction for the machine 402 to follow. In an embodiment, The smart device 404 may communicate information determined by the data analytics module 414 to the local operator 406 via the communication module 410.

Therefore, whenever a predicted future action is communicated to the operator, a corresponding calculated safe time period is also communicated to the operator. Hence, the future action is predicted as 'time bound' to be implemented at the machine and the same is communicated to the operator who has to take the action within that safe time period.

If a certain predicted future action is not taken within a corresponding calculated safe time period, the smart device 404 may either alarm or alert, via the communication module 410, every operator about completion of the safe time period, or may stop the functioning of the machine 402 or may predict a next best possible future action to be implemented, depending on the data analytics performed by the data analytics module 414. Therefore, a closed loop autonomous action is executed by the smart device 404.

Additionally, the data extraction module 412 also provides the machine data from machine tools to the operator via the input/output module 418 or the communication module 410.

Further in an embodiment, the smart device 404 may also include a notification module (not shown in the FIG. 4) which may operate an alarm, an alert or push a notification for the operator to inform about an important working situation such as including and not limited to an emergency situation about any faults in the functioning of the machine 402, or continuous production of poor quality products, or any sudden failure in the operation, or any hazardous situation in/around the machine 402, such as in machine environment or to inform the operator 406 about a necessary and/or urgent future action to be employed within a safe time period, or to alarm the operator about completion of the safe time period. The notification may include and is not limited to a message, an email, an instant message, an automatic phone call, or a continuous time based alarm or may be connected with an external alarm, or an external display screen or speaker for outputting the alarm in audio/video format. In an embodiment, the smart device 404, via its notification module, informs and instructs the local operators, such as designated operators, floor engineers, about the machine information and the information related to the output digital signals and to initiate the predicted future actions, and also informs remotely, through the communication module 410, to other human resources, such as plant managers, or globally to other offices, about the information related to machine and related to the output digital signals including any emergency or faulty functions.

In another embodiment, the smart device 404 may also generate a validation code, which is generated along with determining a particular future action. Therefore, every future action may be provided with a validation code. The validation code is provided to the operator 406, by the smart device 404 via the input/output module 418, which the operator may use to inform the smart device 404 about execution of the particular future action. Therefore, after executing a particular future action at the machine 402 within the safe time period, the operator must input a corresponding generated validation code into the smart device 404 via the input/output module 418 to inform the smart device 404 that the particular future action has been executed.

In an embodiment, the validation code is generated using the data analytics module 414. This way, the smart device 404 is regularly informed about execution of the predicted future actions, and hence, the smart device 404 can effectively ensure satisfactory results by the machine 402 by monitoring and analyzing the functioning of the machine 402 and production of quality products.

Hence, the smart device 404 is able to determine that a particular future action has been executed or not by either keeping a check on the completion of the safe time period calculated corresponding to the particular future action or by being informed via input of the validation code by the operator. In situations where a validation code is not provided to the smart device 404 by the operator within the safe time period, the smart device 404 may take a number of measures, such as including and not limited to stopping the machine 402, or may predict a next possible future action to be implemented depending on current machine data and thereafter, or may alarm or notify the operators about the situation.

Furthermore, the data analytics module 414 along with the monitoring module 408 monitors the execution of the future actions to ensure achievement of satisfactory results. The smart device 404 continuously monitors the functioning of the machine 402, and continuously extracts and receives data to be fed to the analytics module 414 for further determination. Hence, smart device 404 implements a closed loop autonomous method for determining contextual insights in real time about the defective articles produced and executing future actions on the machine. In case satisfactory result is not achieved, the data analytics module 414, along with the monitoring module, may again checks one or more machine operations that are performed immediately prior to the machine cycle which has produced defective article and may predict a next necessary action to be taken, and again instructs the machine 402 and/or the operator to initiate the next level of future action on the machine 402. Therefore, the smart device 404 works in closed loop for predicting future actions and instructing the machines/operators to initiate those actions, till a satisfactory result is obtained.

Advantageously, the present invention provides a comprehensive system that integrates automatically gauging and correcting stations operating in a machine environment with a universal machine monitoring for detecting defective articles, quarantining the defectives, ensuring the defectives are safely quarantined, analyzing the machine data for providing contextual information for the defectives produced, predicting one or more necessary actions to be taken for minimizing defects in future and achieving near zero defect quality in machine production. The comprehensive system provides such contextual information about the defects/faults in the article or the machine operations in real time and locally and remotely to any human resource.

The drawings and the forgoing description give examples of embodiments.

Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed.

Also, those acts that are not dependent on other acts may be performed in parallel with the other acts. The scope of embodiments is by no means limited by these specific examples.

Numerous variations, whether explicitly given in the specification or not, such as differences in structure, dimension, and use of material, are possible. Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A comprehensive system for reducing defects in articles produced by a manufacturing machine, the comprehensive system comprising:
   at least one inspection station including:
      one or more probes and one or more measuring sensors for automatically gauging and measuring one or more geometric tolerances of an article produced by the machine; and
      at least one processing unit, in communication with the probes and the measuring sensors, for comparing the measured one or more geometric tolerances of the article with one or more standard or required geometric tolerances of the article and for determining a deviation in the measured one or more geometric tolerances of the article from the one or more standard or required geometric tolerances, and where the one or more standard or required geometric tolerances are target one or more geometric tolerances for achieving zero defect production or for reducing the defects in production of the article;
   at least one monitoring apparatus, in communication with the at least one inspection station, for continuously monitoring operations and environment of the machine and the article to extract data related to the machine and the article and for executing one or more closed loop smart analytics software application to process the data;
   at least one digital controller for executing digital communication between the at least one inspection station and the at least one monitoring apparatus, and between the at least one monitoring apparatus and at least one quarantine apparatus;
   at least one quarantine apparatus, including at least one quarantine sensor, attached with the at least one inspection station and in communication with the at least one digital controller, for quarantining one or more defective articles from the at least one inspection station and for transmitting a quarantine signal to the at least one digital controller to send a quarantine digital signal to the at least one monitoring apparatus indicating and ensuring quarantining of the one or more defective articles; and
   wherein the comprehensive system is operable to:
      (a) detect, by the at least one inspection station, a defective article based on the deviation that is determined in the measured one or more geometric tolerances of the article from the one or more standard or required geometric tolerances;
      (b) generate, by the at least one digital controller being in communication with the at least one inspection station, one or more output digital signals providing digital information at least related to the defective article, the digital information, provided by the one or more output digital signals, indicating at least about one or more measured geometric tolerances of the article that are deviated from the one or more standard or required geometric tolerances, along with whether the deviated one or more measured geometric tolerances of the article is either rejected or re-workable and time of detection of defective article;
      (c) transmit, by the at least one digital controller, the one or more output digital signals to the at least one monitoring apparatus for the at least one monitoring apparatus to process the one or more output digital signals;
      (d) extract or determine, by the at least one monitoring apparatus executing one or more closed loop smart analytics software application, one or more machine operations or conditions that are performed before a machine cycle that has produced the defective article, the determining of the one or more machine operations or conditions is after receiving and processing the one or more output digital signals, and the determining of the one or more machine operations or conditions being based on the at least one monitoring apparatus continuously monitoring the operations and environment of the machine and the article; and
      (e) compute, by the at least one monitoring apparatus executing one or more closed loop smart analytics software application, information related to the determined one or more machine operations or conditions that are performed before the machine cycle that has produced the defective article with the digital information provided by the one or more output digital signals to determine and provide contextual insights related to the defective article, and
      wherein the at least one monitoring apparatus provides the contextual insights related to the defective article autonomously in real time to local and remote people; and
      wherein the at least one monitoring apparatus being in communication with the at least one quarantine apparatus ensures safe quarantining of the defective articles.

2. The comprehensive system of claim 1, wherein the at least one inspection station further includes a correction unit, including one or more microprocessors and processing algorithms, for auto-correcting one or more measured geometric tolerances which are deviated from the standard geometric tolerances, when the deviation exists within a predetermined tolerance range in the one or more geometric tolerances of the article based on the comparison, such that corrected one or more geometric tolerances of the article is equivalent to the standard geometric tolerances, and wherein the corrected one or more geometric tolerances are communicated to the machine for implementing the corrected one or more geometric tolerances in production of the article to achieve zero defect in the article or to reduce defects in the article.

3. The comprehensive system of claim 2, wherein the at least one monitoring apparatus includes a communication module to provide or transmit information in real time at least to one of local and remote people or one or more machines or a cloud server, individually or in combination, the transmitted information including the contextual insights related to the defective article, alerts or notifications, machine and machine related data, the quarantine digital signal, and
   wherein the communication module may be a wired communication module for wired communication or a wireless communication module for wireless communication, individually or in combination; and
   wherein the at least one monitoring apparatus repeats steps (d) and (e) until defects detected in an article are reduced or minimized or totally eliminated.

4. The comprehensive system of claim 3, wherein the contextual insights includes at least one of the one or more machine operations or conditions that are performed before the machine cycle that has produced the defective article, one or more measured geometric tolerances of the article that are deviated from the one or more standard or required geometric tolerances, along with whether the deviated one or more measured geometric tolerances of the article is either rejected or re-workable, other machine operations that may have produced the defective article, one or more corrective actions for implementation at the machine or machine related environment to reduce production of defective articles or achieve zero defects in the article, stipulated time in which the one or more actions should be implemented, or automatic alerts based on a predefined threshold in production of defective articles for alerting human resources, automatic alerts if the one or more actions are not implemented within the stipulated time, the quarantine digital signal indicating about the quarantined articles, information about the at least one inspection station being mastered, or one or more measured geometric tolerances of the article that are deviated, individually or in combination, and wherein the automatic alerts are based on one or more pre-set rules/guidelines written by users/operators to generate alerts in case of crossing of pre-set thresholds.

5. The comprehensive system of claim 3, wherein the one or more machine operations or conditions that are performed before the machine cycle that has produced the defective article include at least one of a machine start-up, a tool change, or the machine re-started after a stoppage/Lunch Break/Shift Change, or a job changeover (new job set), individually or in combination.

6. The comprehensive system of claim 3, wherein the at least one inspection station is at least one of a digital inspection station including one or more digital probes or digital measuring sensors, or, an analog inspection station including one or more analog probes or analog measuring sensors, individually or in combination; and wherein the at least one monitoring apparatus is a computing device that includes at least one of a camera, a laptop, a desktop, a smart phone, a tablet, an I-pad, an Internet appliance, or an Internet of Things device, individually or in combination; and wherein the at least one monitoring apparatus further includes at least one analytics module executing the one or more closed loop analytics software application which when executed, the at least one monitoring apparatus performs operation of the monitoring apparatus including steps (d) and (e).

7. The comprehensive system of claim 1, wherein the at least one quarantine sensor is at least a camera or a position sensor or a thermal sensor or a force sensor or a weight sensor or any sensor, individually or in combination, that generates the quarantine digital signal to transmit to the at least one digital controller, the quarantine digital signal from the quarantine sensors ensures traceability and further ensures that zero defective articles reach a customer or a buyer; and wherein the comprehensive system is further operable to send automatic alerts to local and/or remote personnel when the quarantine digital signal is not received by the at least one monitoring apparatus.

8. The comprehensive system of claim 1, wherein the one or more output digital signals providing the digital information related to the defective article denotes a rejected geometric tolerance by a digital output signal '0' and a re-workable geometric tolerance by a digital output signal '1', and wherein the one or more output digital signals provided the digital information related to the at least one inspection station being mastered, denoted by a digital output signal 'M' and one or more measured geometric tolerance being extremely far deviated, a digital output signal '0'.

9. A comprehensive method for reducing defects in articles produced by a manufacturing machine, the comprehensive method comprising:

automatically inspecting and measuring, by at least one auto-gauging station, one or more geometric tolerances of an article produced by the machine;

comparing, by at least one auto-gauging station, the measured one or more geometric tolerances of the article with one or more standard or required geometric tolerances of the article for determining a deviation in the measured one or more geometric tolerances of the article from the one or more standard or required geometric tolerances and for detecting a defective article based on the deviation;

continuously monitoring, by at least one monitoring apparatus, operations and environment of the machine and the article to extract data related to the machine and the article, the at least one monitoring apparatus being in communication with the at least one auto gauging station;

quarantining, by at least one quarantine apparatus attached with the at least one auto-gauging station and in communication with at least one digital controller, one or more defective articles from the at least one auto-gauging station; and transmitting, by the at least one quarantine apparatus including at least one quarantine sensor, a quarantine signal to the at least one digital controller to send a quarantine digital signal to the at least one monitoring apparatus indicating and ensuring quarantining of one or more defective articles; and wherein the comprehensive method is further operable to:

(a) detect, by the at least one auto-gauging station, a defective article based on the deviation that is determined in the measured one or more geometric tolerances of the article from the one or more standard or required geometric tolerances;

(b) generate, by the at least one digital controller being in communication with the at least one auto-gauging station, one or more output digital signals providing digital information at least related to the defective article, the digital information, provided by the one or more output digital signals, indicating at least about one or more measured geometric tolerances of the article that are deviated from the one or more standard or required geometric tolerances, along with Whether the deviated one or more measured geometric tolerances of the article is either rejected or re-workable and time of detection of defective article;

(c) transmit, by the at least one digital controller, the one or more output digital signals to the at least one monitoring apparatus for processing the one or more output digital signals;

(d) extract or determine, by the at least one monitoring apparatus executing one or more closed loop smart analytics software application, one or more machine operations or conditions that are performed before a machine cycle that has produced the defective article, the determining of the one or more machine operations or conditions is after receiving and processing the one or more output digital signals, and the determining of the one or more machine operations or conditions being based on the at least one monitoring apparatus continuously monitoring the operations and environment of the machine and the article; and (e) compute, by the at least one monitoring apparatus executing one or more closed loop smart analytics software application, information related to the determined one or more machine operations or conditions that are performed before the machine cycle that has produced the defective article with the digital information provided by the one or more output digital signals to determine and provide contextual insights related to the defective article, and wherein the at least one monitoring apparatus provides the contextual insights related to the defective article autonomously in real time to local and remote people; and wherein the at least one monitoring apparatus being in communication with the at least one quarantine apparatus ensures safe quarantining of the defective articles.

10. The method of claim 9, wherein the at least one auto-gauging station further includes a correction unit, including one or more microprocessors and processing algorithms, for auto-correcting one or more measured geometric tolerances which are deviated from the standard geometric tolerances, when the deviation exists within a predetermined tolerance range in the one or more geometric tolerances of the article based on the comparison, such that corrected one or more geometric tolerances of the article is equivalent to the standard geometric tolerances, and wherein the corrected one or more geometric tolerances are communicated to the machine for implementing the corrected one or more geometric tolerances in production of the article to achieve zero defect in the article or to reduce defects in the article.

11. The method of claim 10, wherein the at least one monitoring apparatus includes a communication module to provide or transmit information in real time at least to one of local and remote people or one or more machines or a cloud server, individually or in combination, the transmitted information including the contextual insights related to the defective article, alerts or notifications, machine and machine related data, the quarantine digital signal, individually or in combination; and wherein the communication module may be a wired communication module for wired communication or a wireless communication module for wireless communication, individually or in combination; and wherein the at least one monitoring apparatus repeats steps (d) and (e) until defects detected in an article are reduced or totally eliminated.

12. The method of claim 11, wherein the at least one auto-gauging station is at least one of a digital auto-gauging station including one or more digital probes or digital measuring sensors, or, an analog auto-gauging station including one or more analog probes or analog measuring sensors, individually or in combination, measuring the one or more geometric tolerances of the article produced by the machine; and the at least one auto-gauging station further including at least one processing unit, in communication with the probes and the measuring sensors, for comparing the measured one or more geometric tolerances of the article with one or more standard or required geometric tolerances of the article, and determining the deviation in the measured one or more geometric tolerances of the article from the one or more standard or required geometric tolerances and detecting the defective article based on the deviation.

13. The method of claim 11, wherein the method further includes:

digital communication between the at least one auto-gauging station and the at least one monitoring apparatus via the at least one digital controller; and digital communication between the at least one monitoring apparatus and the at least one quarantine apparatus via the at least one digital controller; and wherein the at least one digital controller is at least one of a programmable logic controller, a microprocessor or any computing device, individually or in combination, that is able to convert information received from the at least one auto-gauging station and the at least one quarantine apparatus into the output digital signals and the quarantine digital signal respectively to be communicated to the at least one monitoring apparatus.

14. The method of claim 13, where in the method further includes automatically alerting local and/or remote people and/or one or more machines, by the at least one monitoring apparatus, based on pre-defined thresholds.

15. The method of claim 11, wherein the contextual insights includes at least one of the one or more machine operations or conditions that are performed before the machine cycle that has produced the defective article, one or more measured geometric tolerances of the article that are deviated from the one or more standard or required geometric tolerances, along with whether the deviated one or more measured geometric tolerances of the article is either rejected or re-workable, other machine operations that may have produced the defective article, one or more actions for implementation at the machine or machine related environment to reduce production of defective articles or to achieve zero defects in the article, stipulated time in which the one or more actions should be implemented, or automatic alerts based on a predefined threshold in production of defective articles for alerting human resources, automatic alerts if the one or more actions are not implemented within the stipulated time, the quarantine digital signal indicating about the quarantined articles, information about the at least one auto-gauging station being mastered, or one or more measured geometric tolerances of the article that are deviated, individually or in combination, wherein the automatic alerts are based on one or more pre-set rules/guidelines written by users/operators to generate alerts in case of crossing of pre-set thresholds.

16. The method of claim 11, wherein the one or more machine operations or conditions that are performed before the machine cycle that has produced the defective article include at least one of a machine start-up, a tool change, or the machine re-started after a stoppage/Lunch Break/Shift Change, or a job changeover (new job set), individually or in combination.

17. The method of claim 9, wherein the at least one monitoring apparatus is a computing device that includes at least one of a camera, a laptop, a desktop, a smart phone, a tablet, an I-pad, an Internet appliance, or an Internet of Things device, individually or in combination; and wherein the at least one monitoring apparatus further includes at least one analytics module executing the one or more closed loop analytics software application which when executed, the at least one monitoring apparatus performs operation of the monitoring apparatus including steps (d) and (e).

18. The method of claim 9, wherein the at least one quarantine sensor is at least a camera or a position sensor or a thermal sensor or a force sensor or a weight sensor or any sensor, individually or in combination, that generates the quarantine digital signal to transmit to the at least one digital controller, the quarantine digital signal from the quarantine sensors ensures traceability and further ensures that zero defective articles reach a customer or a buyer; and wherein the comprehensive system is further operable to send automatic alerts to local and/or remote personnel when the quarantine digital signal is not received by the at least one monitoring apparatus.

19. The method of claim 9, wherein the one or more output digital signals providing the digital information related to the defective article denotes a rejected geometric tolerance by a digital output signal '0' and a re-workable geometric tolerance by a digital output signal '1', and wherein the one or more output digital signals provided the digital information related to the at least one auto-gauging station being mastered, denoted by a digital output signal 'M' and one or more measured geometric tolerance being deviated, a digital output signal '0'.

20. The method of claim 9, wherein the at least one auto-gauging station collects inspected information about the defective articles, wherein the inspected information includes at least time of producing the defective article, the one or more measured geometric tolerance or dimension which has not met the standard geometric tolerance or dimension or which has deviated because of which the article is defective, the defective article is either rejected or re-workable or partially re-workable, or the at least one auto-gauging station being mastered; and wherein the at least one monitoring apparatus determines monitored defective data, wherein the monitored defective data includes at least the one or more machine operations or conditions that are performed before the machine cycle that has produced the defective article, and wherein the method further includes:

transmitting, by the at least one auto-gauging station, the inspected information to the at least one digital controller for converting the inspected information to the one or more output digital signals;

transmitting, by the at least one digital controller, the one or more output digital signals to the at least one monitoring apparatus, the one or more output digital signals being related to the inspected information;

extracting, by the at least one monitoring apparatus executing the one or more closed loop smart analytics software application, the inspected information from the one or more output digital signals to determine the monitored defective data;

combining, by the at least one monitoring apparatus executing the one or more closed loop smart analytics software application, the inspected information, extracted from the one or more output digital signals, with the monitored defective data to determine and provide the contextual insights related to the defective article; and transmitting, by the at least one monitoring apparatus, the contextual insights to local and/or remote people, and/or one or more machines globally or a cloud server in real time.

\* \* \* \* \*